United States Patent
Kobayashi

(10) Patent No.: US 7,302,281 B2
(45) Date of Patent: Nov. 27, 2007

(54) WIRELESS LAN UTILIZABILITY DETECTING SYSTEM AND METHOD

(75) Inventor: Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 498 days.

(21) Appl. No.: 10/658,199

(22) Filed: Sep. 10, 2003

(65) Prior Publication Data

US 2004/0058707 A1  Mar. 25, 2004

(30) Foreign Application Priority Data

Sep. 11, 2002 (JP) ............................. 2002-264987

(51) Int. Cl.
*H04B 1/38* (2006.01)

(52) U.S. Cl. .................. 455/574; 455/558; 455/575.1; 455/557; 713/320; 713/310; 713/150; 713/153

(58) Field of Classification Search ................ 455/558, 455/557, 575.7, 574, 41.2; 709/250; 713/300, 713/310, 153, 155

See application file for complete search history.

(56) References Cited

U.S. PATENT DOCUMENTS 6,493,824 B1* 12/2002 Novoa et al. ............... 713/162
6,832,388 B1* 12/2004 Du Val ....................... 725/110
2002/0174254 A1 11/2002 Kita et al.
2004/0203352 A1* 10/2004 Hall et al. .................. 455/41.1
2004/0203698 A1* 10/2004 Comp ......................... 455/421

FOREIGN PATENT DOCUMENTS

| JP | 62-031240 | 2/1987 |
|----|-----------|--------|
| JP | 3-130650 | 12/1991 |
| JP | 10-056673 | 2/1998 |
| JP | 11-053066 | 2/1999 |
| JP | 2001-165973 | 6/2001 |
| JP | 2001-285297 | 10/2001 |
| JP | 2001-325166 | 11/2001 |

OTHER PUBLICATIONS iPAQ Newtorking 11Mbps Wireless PC Cards Installation and Setup Guide, Compaq Computer Corporation, 2001, pp. 1-17.*

* cited by examiner

*Primary Examiner*—Lester G. Kincaid
*Assistant Examiner*—Dung Lam
(74) *Attorney, Agent, or Firm*—Foley & Lardner LLP

(57) ABSTRACT

The disclosed system, is arranged as an adapter for mounting a wireless LAN card 3 on a data terminal device 2, and it obtains a detection output based on the intensity of wave in a predetermined wireless LAN band. Based on this output, the system informs to a user as an output representing a content as to whether the pertinent wireless LAN can be utilized for light emission from an LED that the user is in a hot spot region.

13 Claims, 5 Drawing Sheets

WIRELESS LAN UTILIZABILITY DETECTING SYSTEM AND METHOD

BACKGROUND OF THE INVENTION

This application claims benefit of Japanese Patent Application No. 2002-264987 filed on Sep. 11, 2002, the contents of which are incorporated by the reference.

The present invention relates to a wireless LAN utilizability detecting system and a wireless LAN utilizability detecting method capable of automatic decision as to whether the user is in an area, in which such a wireless LAN service as so-called hot spot service or the like is provided.

The so-called "hot spot service" has been becoming an actually used service, which provides internet connection or contents services in particular places such as hotels, coffee shops and fast food shops. This service means such services in very limited areas as provision of internet connection by a wireless technique which is called local wireless interface such as wireless LAN and bluetooth.

With the spread of hot spots in such wireless LAN, social need for the provision of clear indication of data that the wireless LAN can be utilized, has been particularly increasing. However, even in fast food chain shops belonging to the same shop group, those providing the hot spot service are limited. Also, it may happen that the user buss by a shop or the like, which is providing this type of hot spot service, without noticing this fact.

While it has hitherto been proposed that when a wired telephone call is received, the power supply of the telephone set is automatically turned on based on the call reception signal, with mere response to the sending of a particular call from the opposite side it is impossible to cope with the above status that the user can not become aware of a hot spot. The above prior art proposal is not based on a preamble that a hot spot or like environment arises, and therefore the above technical problems are not considered (see, for instance, Japanese Utility Model laid open No. Hei 3-130650 and Japanese Patent laid open No. Shou 62-31240.

It has also been proposed to assemble a TV tuner circuit with an urgent broadcast receiving function in a personal computer such that, when it receives an urgent broadcast, the TV tuner circuit provides an output to cause the personal computer to be started to watch the urgent TV broadcast of the TV (see, for instance, Japanese Patent laid open No. Hei 11-5366)

Furthermore, recently proposed have been a card type mounted in a personal computer and including a setting means which receives from a host computer setting data necessary for network setting to connect the personal computer to a local area network to the host therein and performs the network setting by using the setting data (see, for instance, Japanese Patent laid open No. 2001-325166).

However, according to none of the above prior art proposals, it can be directly expected to provide improved convenience that a person, who desires to utilize a wireless LAN hot spot service, can recognizes without possibility of missing that the service is provided.

SUMMARY OF THE INVENTION

An object of the present invention is to provide a wireless LAN utilizability detecting system and method, which is mounted on a personal computer or like data terminal and ensures such convenience that, when a user enters an area permitting actual communication by wireless LAN, it informs the fact to the user and also automatically starts a pertinent data terminal.

According to an aspect of the present invention, there is provided a wireless LAN utilizability detecting system comprising a housing detachably mounted on a data terminal device, a wave intensity detecting means disposed at least partly inside the housing and serving to obtain a detection output corresponding to wave in a predetermined wireless LAN band, and a detection output means disposed in the housing and serving to generate an output representing a content as to whether the wireless LAN is utilizable based on the output of the wave intensity detecting means.

The housing constitutes an adapter for mounting a wireless LAN card on the pertinent data terminal device. The housing constitutes a housing of a wireless LAN card. The wave intensity detecting means operates without being supplied by power from a separate power supply but by power obtained by receiving wave in a predetermined wireless LAN band. The wave intensity detecting means includes a comparing means for comparing the intensity of detected wave in the predetermined wireless LAN band and generating an output corresponding to the comparison result as output of the wave intensity detecting means. The detection output means is arranged to output a signal for starting the data terminal device based on the output of the wave intensity detection means. The detection output means is arranged to drive a display means provided on the housing according to the output of the wave intensity detecting means. An LED is used as the display means. The housing includes a wireless LAN card side connector, a data terminal device side connector and an inter-connector bus interconnecting the two connectors, and which further comprises an active checking means for checking whether the inter-connector bus is active and, when the inter-connector is found to be active, rendering the wave intensity detecting means or the detection output means inoperative.

According to another aspect of the present invention, there is provided a wireless LAN utilizability detecting method, in which a wireless LAN utilizability detecting system comprising a housing detachably mounted on a data terminal device, a wave intensity detecting means disposed at least partly on the housing and serving to obtain a detection output corresponding to the intensity of wave in a predetermined wireless LAN band, and a detection output means for generating, based on the output of the wave intensity detecting means, an output representing a content as to whether the wireless LAN is utilizable, is mounted in the pertinent data terminal device, when it receives an output from the detection output means of the wireless LAN utilizability detecting system, it checks whether the value of the received output and a predetermined value are identical, when the identity is recognized, it causes an automatic start operation, when the identity is not recognized, it holds a waiting state, when the automatic start operation is made, it checks whether the pertinent wireless LAN can perform authentication, when it is decided that authentication can be performed, it does an informing operation to inform to the user that the user can perform actual communication, and when it is not decided that authentication can be done, it turns off the power supply.

The informing operation is performed by generation of voice, image display or generation of vibrations. The informing operation performed by generating a call to a portable telephone set or a PHS by a short message service. In the wireless LAN utilizability detecting method transmission and reception of electronic mails are made a swell based on the informing operation. In the wireless LAN utilizability detecting method data from a particular web page is automatically collected as well based on the informing operation.

Other objects and features will be clarified from the following description with reference to attached drawings.

PREFERRED EMBODIMENTS OF THE INVENTION

Preferred embodiments of the present invention will now be described with reference to the drawings.

Figure 1:
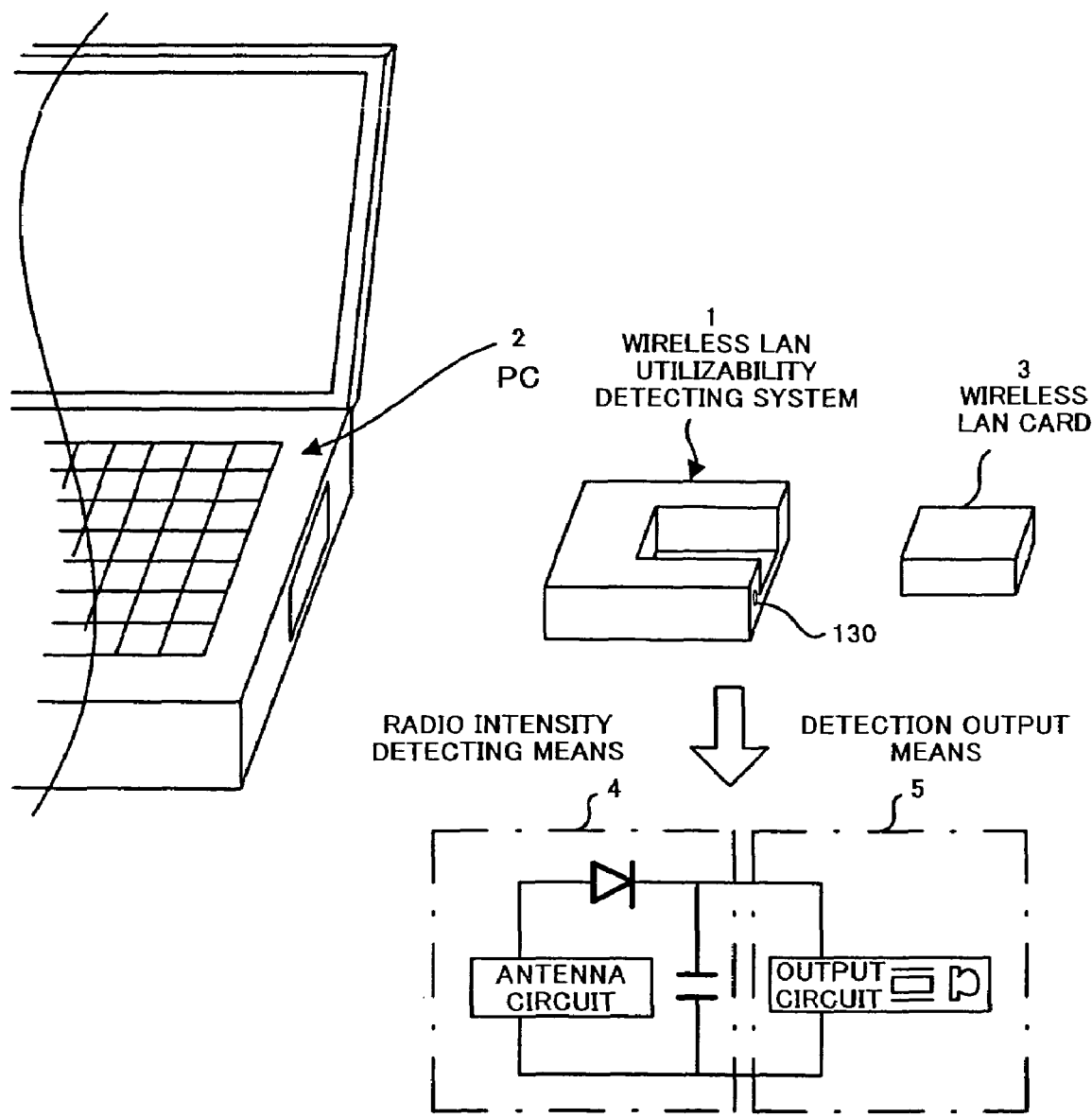
FIG. 1 is a view for describing the outline of a wireless LAN utilizability detecting system according to the present invention.
Figure 2:
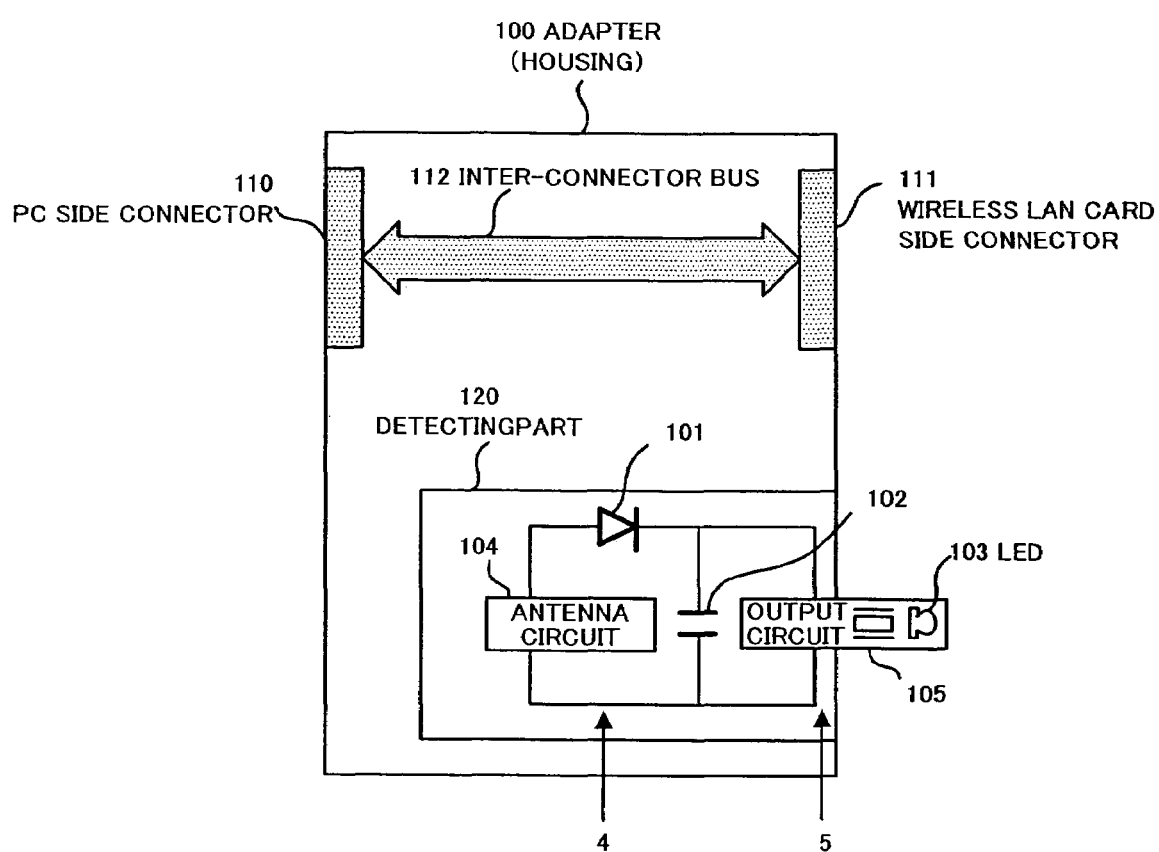
FIG. 2 is a block diagram for describing the circuit arrangement of an embodiment of the wireless LAN utilizability detecting system according to the present invention as shown in FIG. 1.

FIG. 1 is a view for describing the outline of a wireless LAN utilizability detecting system according to the present invention. FIG. 2 is a block diagram for describing the circuit arrangement of an embodiment of the wireless LAN utilizability detecting system according to the present invention as shown in FIG. 1.

The wireless LAN utilizability detecting system according to the present invention can be constructed as a wireless LAN card adapter as shown in, for instance, FIG. 1.

The wireless LAN utilizability detecting system according to the present invention as exemplified in FIGS. 1 and 2, is detachably mounted on a personal computer 2 as data terminal device, and is adapted to function as a wireless LAN card adapter to permit relaying and coupling together the personal computer 2 and the wireless LAN card 3.

The wireless LAN utilizability detecting system 1 according to the present invention comprises a housing 100, a (radio) wave intensity detecting means 4 provided in the housing 100 for obtaining a detection output corresponding to the intensity of wave in a predetermined wireless LAN band, and a detection output means 5 for generating an output indicative of whether the wireless LAN is utilizable based on the output of the wave intensity detecting means 4.

In the embodiment shown in FIG. 1, the wireless LAN utilizability detecting system 1 is constructed as the wireless LAN card adapter, this is by no means limitative, and according to the present invention it is possible as well to construct the housing as a housing of the wireless LAN card itself.

The arrangement of the embodiment of the wireless LAN utilizability detecting system 1 according to the present invention will now be described with reference to FIG. 2. The housing 100 of the wireless LAN card adapter includes a personal computer side connector 110 coupled to an IC card connector on the side of the personal computer 2, a wireless LAN card side connector 111 as a connector coupled to the wireless LAN card 3, and an inter-connector bus 112 for coupling signals between the above two connectors.

A detecting system part 120 which detects the utilizability of the wireless LAN includes the wave intensity detecting means 4 constituted by an antenna circuit 104, a diode 101 and a capacitor 102, and the detection output means 5 constituted by an LED 103 and an output circuit 105 as a circuit for driving the LED 103.

The detecting system part 120 is resonated with the radio wave in a predetermined band to generate a voltage across the capacitor 102 to turn on the LED 103. This light emission by the LED 103 provides a service that, even when the personal computer power supply is "off", the presence of the wave intensity above a predetermined level in a 2.4 or 5.0 GHz wireless LAN communication band is made recognizable. The detection band is not limited to 2.4 or 5.0 GHz band; for instance it is possible to cover, for instance, 1.9 GHz PHS band as well. As for the light emission by the LED 103, it is possible to arrange such that weak radio waves are accumulated to accumulate power for periodic flickering light emission, although it is of course possible to arrange such as to provide continuous light emission.

Figure 3:
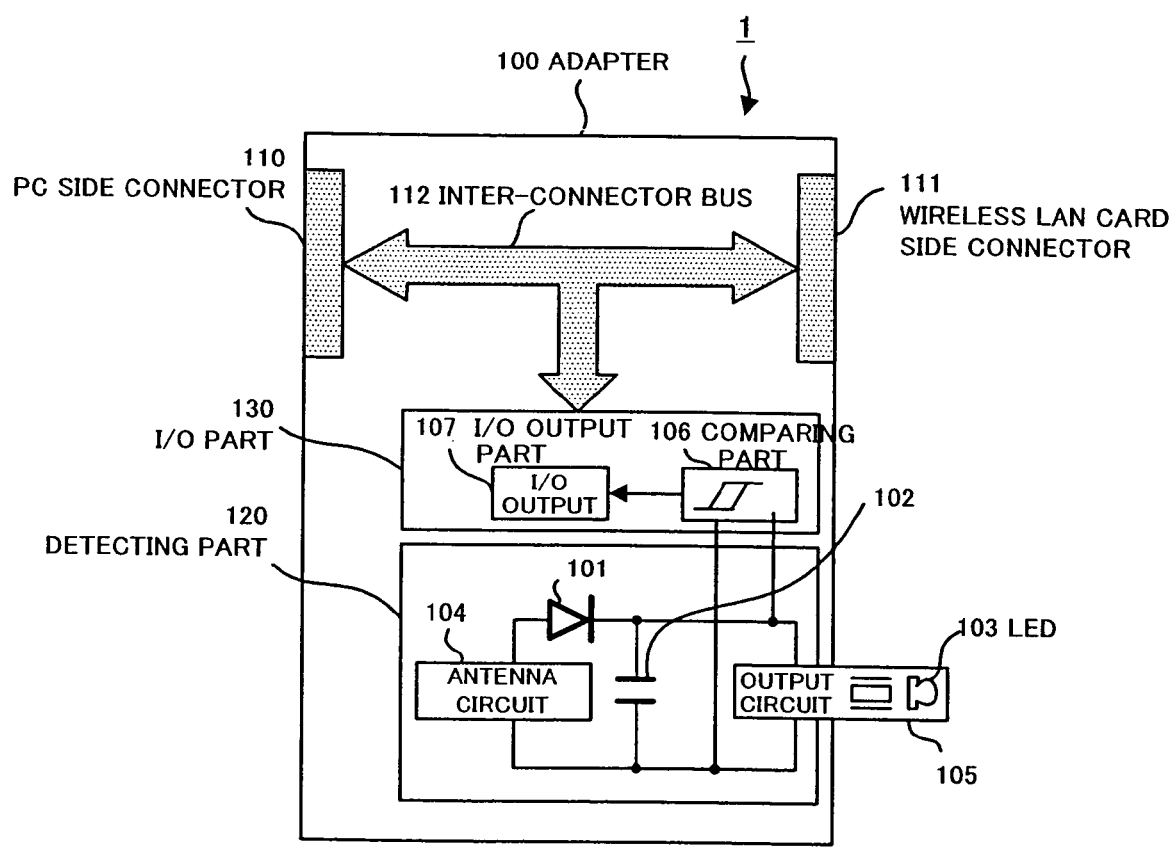
FIG. 3 is a view showing a different embodiment of the present invention.

FIG. 3 is a view showing a different embodiment of the present invention. In this embodiment of the wireless LAN utilizability detecting system 1, the wave intensity detecting means 4 is arranged such that it includes a comparing part 106, which serves as comparing means for comparing the intensity of wave in a predetermined wireless LAN band as detected in the antenna circuit 104 with a predetermined value and providing an output corresponding to the result of comparison as output of the wave intensity detecting means 4.

In FIG. 3, parts corresponding to those in FIG. 2 are designated by like reference numerals. In this embodiment, in addition to the circuit shown in FIG. 1, I/O part 130 is provided, which includes the comparator 106 for comparing the detecting part output intensity and an I/O output part 107. The comparing part 106 checks by comparison with the predetermined value as to whether the received wave intensity has a signal level above a predetermined value, and it is decided that the signal level is above the predetermined value, it sends the detection output signal to the I/O output part 107. The I/O output part 107 provides, based on the detection output signal from the comparing part 106, an output of a predetermined bit value representing a predetermined I/O address to a personal computer side connector 110. This predetermined bit value is an automatic start instruction to the personal computer. That is, according to this automatic start instruction, the personal computer power supply is turned on from the "off" state, permitting actual communication. Thus automatic start signal may be a predetermined signal pin of a PC card bus or a CF 2 card bus. As an example, the automatic start signal may be 46 size pin of CF card.

Figure 4:
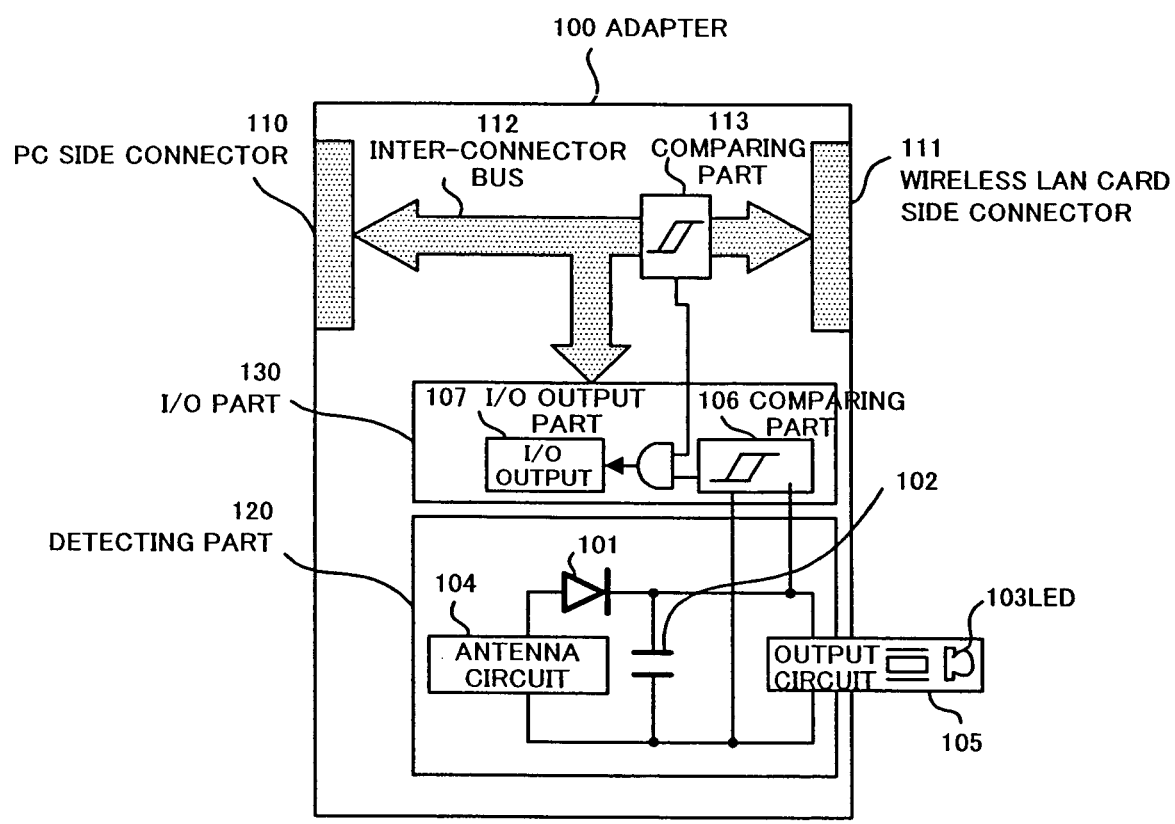
FIG. 4 is a view showing a further embodiment of the present invention.

FIG. 4 is a view showing a further embodiment of the present invention. In the Figure, parts corresponding to those in FIG. 3 are designated by like reference numerals. In this embodiment, in addition to the embodiment shown in FIG. 3, the inter-connector bus 112 is connected to a comparing part 113, which performs an active checking/deciding operation of checking whether the bus is active and, when the bus is active, providing an output for rendering the wave intensity detecting means or the detection output means to be inoperative. In the fourth embodiment, the comparing part 113 checks whether the bus 112 is active, and when it decides that the bus 112 is active, it sends a decision signal to the I/O part 130 and brings the I/O part to an enable (i.e., pause) mode, thus rendering the detecting part 120 (i.e., the wave intensity detecting means or the detection output means) to be inoperative so that actual data communication will not be disturbed by signal from the circuit subsequent to the I/O part 130 as noise. In the above embodiments, the arrangement of using the sole resonant power based on the received wave as operation power supply is by no means limitative; for example, a large capacity capacitor or a charging battery may be mounted on a wireless LAN card adapter (or wireless LAN card itself) such as to function as operation power supply.

Figure 5:
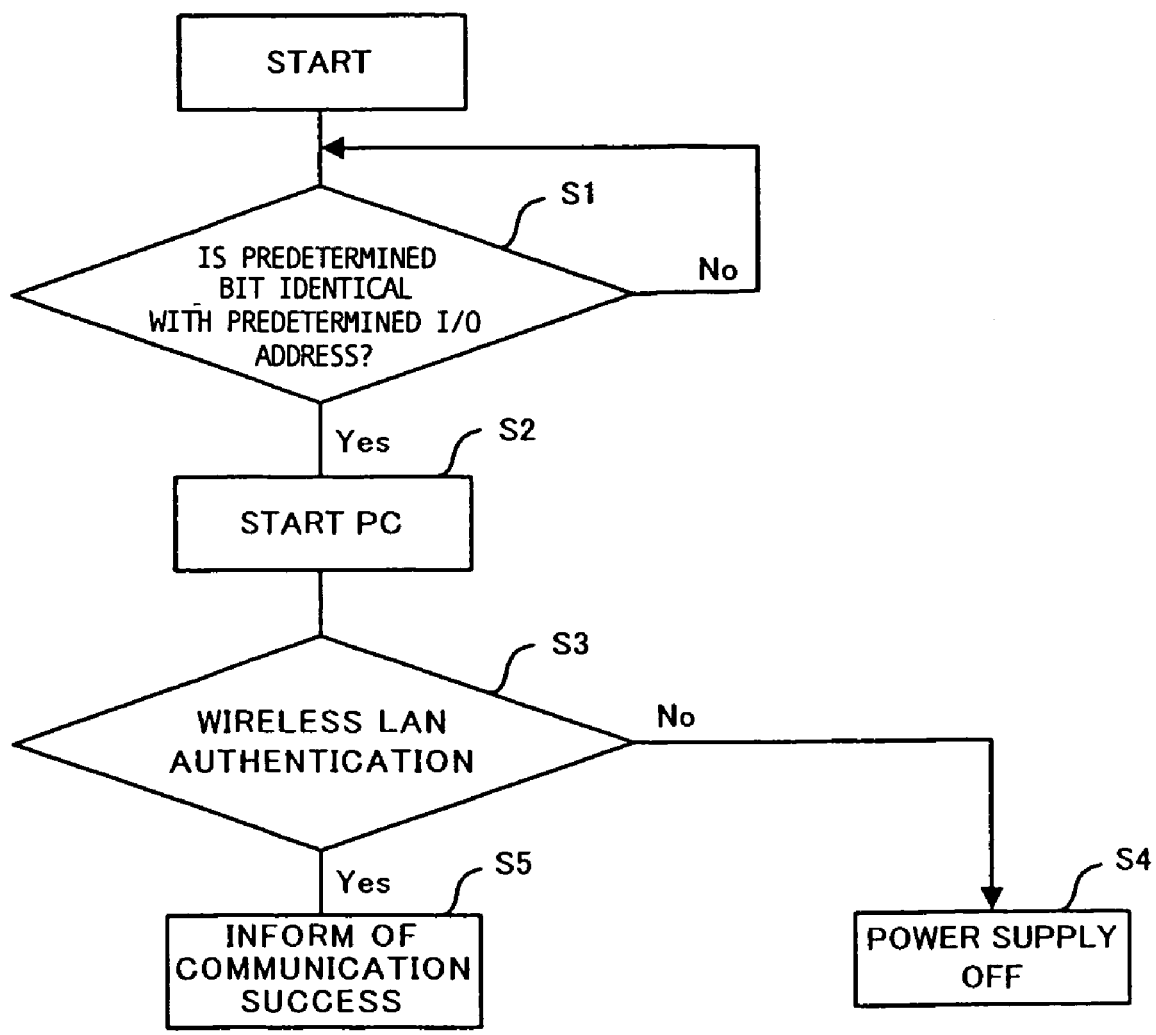
FIG. 5 is a flow chart for describing an embodiment of a method according to the present invention.

FIG. 5 is a flow chart for describing an embodiment of a method according to the present invention. When an automatic start instruction of a predetermined bit value as described before in connection to FIG. 3 is provided, a check is made on the basis of software provided on the personal computer side as to whether the predetermined bit value is identical with predetermined bit value data representing a predetermined address (step S1). When the two predetermined bit values are identical, the personal computer is started (step S2). Otherwise, the personal computer is held in the waiting state. After the start of the personal computer, a check is made as to whether authentication of the wireless LAN is obtainable (step S3). When authentication is not obtained, the pertinent hot spot is not regarded to be a subscribed hot spot, and the power supply is turned off (step S4). When authentication is obtained, it is informed by such means as sound, display or vibrations that actual communication can be made (step S5). In the above way, power saving is made such that no wasteful power is consumed by operation in any wireless LAN station, which is unsuccessful in authentication.

In the case of informing by vibrations to the user that the user can perform actual communication, it is also possible to arrange such that the data terminal itself, on which the adapter according to the present invention is mounted, generates vibrations. As a further alternative, a predetermined portable telephone set may be adapted to be vibrated by a short mail transmitted to it. Furthermore, not only the state allowing actual communication is informed, but also it may be adapted to be able to automatically transmit and receive electronic mails. Moreover, it may be adapted to be able to automatically collect data from a particular web page.

According to the present invention, a wireless LAN utilizability detecting system is provided, which is mounted on a data terminal, and when a user enters a region, in which actual communication by wireless LAN is allowed. it informs this fact the user and also ensures the convenience of automatically starting the own data terminal, and also a method of implementing the same wireless LAN utilizability detecting system are provided.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A wireless LAN utilizability detecting system comprising:
   a housing detachably mounted on a data terminal device, said data terminal device having a main power supply;
   a wave intensity detecting means disposed at least partly inside the housing and configured to obtain a detection output corresponding to a wave in a predetermined wireless LAN band, including a resonating circuit configured to derive power from said wave even when the main power supply of the data terminal is off; and
   a detection output means disposed in the housing and configured to generate an output indicating whether the wireless LAN is utilizable based on the output of the wave intensity detecting means; and
   a separate power supply configured to provide power for said wave detecting means even when the main power supply of the data terminal device is off.

2. The wireless LAN utilizability detecting system according to claim 1, wherein the housing constitutes an adapter for mounting a wireless LAN card on the pertinent data terminal device.

3. The wireless LAN utilizability detecting system according to claim 2, in which the housing includes a wireless LAN card side connector, a data terminal device side connector and an inter-connector bus inter-connecting the two connectors, and which further comprises an active checking means for checking whether the inter-connector bus is active and, when the inter-connector is found to be active, rendering the wave intensity detecting means or the detection output means inoperative.

4. The wireless LAN utilizability detecting system according to claim 1, wherein the housing constitutes a housing of a wireless LAN card.

5. The wireless LAN utilizability detecting system according to claim 1, wherein the wave intensity detecting means includes a comparing means for comparing the intensity of a detected wave in the predetermined wireless LAN band and generating an output corresponding to the comparison result.

6. The wireless LAN utilizability detecting means according to claim 1, wherein the detection output means is configured to output a signal for starting the data terminal device based on the output of the wave intensity detection means.

7. The wireless LAN utilizability detecting system, according to claim 1, wherein the detection output means is configured to drive a display means provided on the housing according to the output of the wave intensity detecting means.

8. The wireless LAN utilizability detecting system according to claim 7, wherein the display means comprises an LED.

9. A wireless LAN utilizability detecting method, in which a wireless LAN utilizability detecting system comprising a housing is detachably mounted on a data terminal device, a main power supply for said data terminal device, a wave intensity detecting means disposed at least partly on the housing and serving to obtain a detection output corresponding to the intensity of a wave in a predetermined wireless LAN band, the wave intensity detecting means including a resonating circuit configured to derive power from said wave even when the main power supply of the data terminal is off, and a detection output means for generating, based on the output of the wave intensity detecting means, an output indicating whether the wireless LAN is utilizable, is mounted in the pertinent data terminal device, said method comprising:
   receiving an output from the detection output means of the wireless LAN utilizability detecting system;
   checking whether the value of the received output and a predetermined value are identical;
   if the value of the received output and the predetermined value are identical, initiating an automatic start operation of the data terminal including turning on the main power supply;

if the value of the received output and the predetermined value are not identical, maintaining a waiting state;

after initiating the automatic start operation checking whether the pertinent wireless LAN can perform authentication;

if authentication can be performed, informing a user that the user can perform actual communication;

if authentication can not be done, turning off the main power supply.

10. The wireless LAN utilizability detecting method according to claim 9, wherein said informing is performed by generation of voice, image display or generation of vibrations.

11. The wireless LAN utilizability detecting method according to claim 9, wherein said informing is performed by generating a call to a portable telephone set or a PHS by a short message service.

12. The wireless LAN utilizability detecting method according to claim 9, further comprising enabling the data terminal device to transmit and receive electronic mails.

13. The wireless LAN utilizability detecting method according to claim 9, further comprising enabling the data terminal device to collect particular web page data automatically.

* * * * *